UNITED STATES PATENT OFFICE.

NICOLAS MARCHAL, OF DIEUZE, GERMANY, ASSIGNOR TO THE ANCIENNES SALINES DOMANIALES DE L'EST, ACTIEN-GESELLSCHAFT, OF SAME PLACE.

ELECTRIC DIAPHRAGM.

SPECIFICATION forming part of Letters Patent No. 592,802, dated November 2, 1897.

Application filed January 13, 1896. Serial No. 575,380. (No specimens.) Patented in Germany August 28, 1894, No. 82,352.

*To all whom it may concern:*

Be it known that I, NICOLAS MARCHAL, a citizen of the Empire of Germany, residing at Dieuze, in the said Empire, have made a certain new and useful Invention in Electric Diaphragms, (for which I have obtained Letters Patent of Germany, No. 82,352, dated August 28, 1894,) of which the following is a full, clear, and exact specification, reference being had to the accompanying drawing.

The osmotic diaphragms hitherto in use for electrolyzing saline solutions have not given full satisfaction, and therefore various experiments have been made to find a substance which will practically answer all requirements. In this way we have been led to make use for such purposes of the carbonates of the alkaline earths. The diaphragms are formed from such substances in their natural state. For instance, they may simply be cut from limestone blocks in any desired form—such as plates, tiles, tubes, pots, or boxes corresponding to the shape of the electrolytic apparatus. Diaphragms made from a moistened mixture or paste of pulverized limestone and burned magnesia, compressed, have also answered well, proving sufficiently durable.

Limestone diaphragms are found to be especially adapted to the electrolysis of alkalies combined with chlorin. The well-known effect of the latter on powdered carbonate of lime does not extend to carbonate of lime in solid form. Even small pieces of it exposed to this action remain intact. These diaphragms oppose only a slight resistance to the current, while fulfilling very well the purpose of separating the zones. They are practically indifferent to and unaffected by the electrolytic products, and their durability is very great. Six months use of a full size practical diaphragm has given no cause for dissatisfaction.

I am aware that it is not new in galvanic batteries to employ cells, troughs, or chambers of porous alkaline cement as a substitute for the porous porcelain more commonly used, such cement being lime cement, chalk cement, or hydraulic cement, as preferred.

I do not claim a cement diaphragm; but

What I claim as new, and desire to secure by Letters Patent, is—

An electrolytic diaphragm in the form of a plate cut from limestone or equivalent integral natural alkaline-earth carbonate substantially as described.

In testimony whereof I have hereunto signed my name in the presence of two subscribing witnesses.

NICOLAS MARCHAL.

Witnesses:
   CHARLES KOLLE,
   ERNEST THERION.